UNITED STATES PATENT OFFICE.

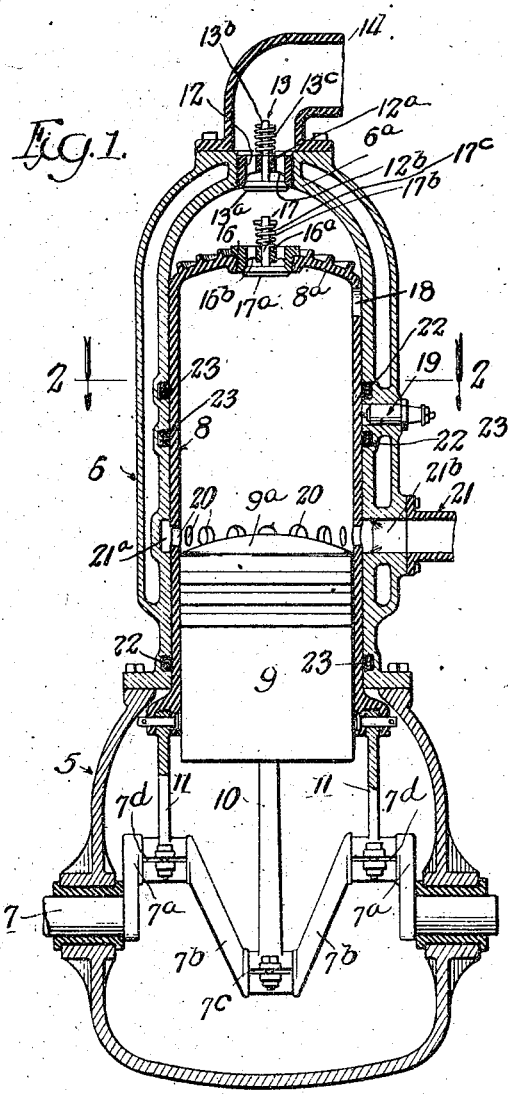

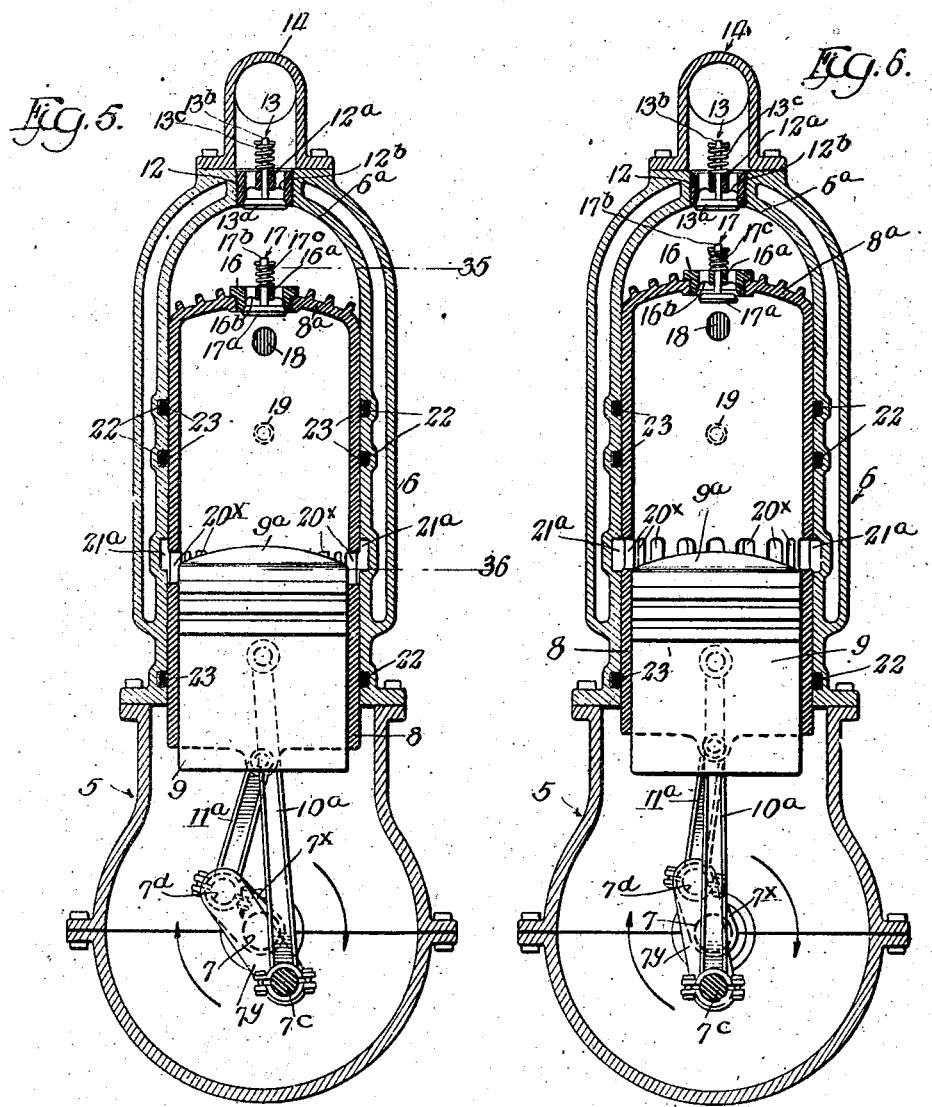

HARRY K. TARKINGTON, OF CHICAGO, ILLINOIS.

EXPLOSIVE-ENGINE.

1,178,691.  Specification of Letters Patent.  Patented Apr. 11, 1916.

Application filed February 8, 1912. Serial No. 676,279.

*To all whom it may concern:*

Be it known that I, HARRY K. TARKINGTON, a citizen of the United States, and a resident of Chicago, in the county of Cook and State of Illinois, have invented certain new and useful Improvements in Explosive-Engines; and I do hereby declare that the following is a full, clear, and exact description thereof, reference being had to the accompanying drawings, and to the letters of reference marked thereon, which form a part of this specification.

This invention relates to improvements in explosive engines of the so-called balanced type and consists of the matters hereinafter described and more particularly pointed out in the appended claim.

In the drawings Figure 1 is a view representing a vertical section through the cylinder and crank case of my improved engine; Fig. 2 is a view representing a cross-section through the engine on the line 2—2 of Fig. 1; Fig. 3 is a detail sectional view to be referred to more fully in the specification; Fig. 4 is a view representing a modified form of my invention; Fig. 5 is a view representing a vertical section through the cylinder in a plane at right angles to that of Fig. 1 and showing a modified arrangement of the crank arms; Fig. 6 is a view similar to Fig. 5 showing the parts in a different position.

Referring now in detail to that embodiment of my invention illustrated in Figs. 1 to 3 of the drawings, 5 indicates as a whole, the crank case, and 6, the cylinder. 7 indicates a crank shaft rotatively mounted in suitable bearings in the crank case and having crank arms 7ª, 7ª, and 7ᵇ. 8 indicates a hollow piston having bearing engagement within and adapted for longitudinal reciprocatory movement in the cylinder 6. Said hollow piston has a head 8ª at its upper end and is open at the lower end. Within the hollow piston 8 is located a piston 9 which has bearing engagement therewith and is capable of longitudinal, reciprocatory movement therein. Said piston has a head 9ª. A connecting rod 10 connects the piston 9 with the crank pin 7ᶜ of the crank arm 7ᵇ, and connecting rods 11, 11 are provided for connecting the hollow piston 8 with crank pins 7ᵈ, 7ᵈ of the crank arms 7ª, 7ª. The crank arms 7ª, 7ª are arranged substantially at an angle of 180° to the crank arm 7ᵇ so that when the crank shaft 7 is rotated, the heads 9ª and 8ª of the pistons will approach each other during one-half the rotation of the crank shaft, and will recede from each other during the remaining half of said rotation. The power is thus applied to the crank shaft always in opposite directions by the pistons thereby providing a balanced strain on the crank shaft from which fact this type of engine gets its name.

In the head 6ª of the cylinder 6 is located an apertured valve plug 12 which provides a seat at its lower end for an inwardly opening, spring controlled valve 13. As shown, the movable valve member 13 comprises a disk 13ª adapted to seat against the lower end of the apertured plug 12 and an upwardly extending stem 13ᵇ having sliding engagement in a ring or sleeve 12ª which is centrally located within the aperture of the plug 12 and which is rigidly connected therewith by radial ribs 12ᵇ between which the explosive mixture passes on entering the cylinder 6. A coiled spring 13ᶜ bearing between the top of the bearing sleeve 12ª and a pin or other part fixed to the valve stem 13ª normally holds the valve disk 13ª against its seat.

14 indicates an inlet pipe leading from the carbureter and adapted to supply the explosive mixture to the cylinder 6 when the valve 13 is open.

In the head 8ª of the hollow piston 8 is located an apertured valve plug 16 which has a seat at its lower end for an inwardly opening, spring controlled valve 17. The valve 17 comprises a disk 17ª adapted to seat against the lower end of the plug 16 and an upwardly extending stem 17ᵇ which has sliding engagement in a ring or sleeve 16ª located within the aperture of the plug 16, the said ring or sleeve 16ª being rigidly connected to the plug by radial ribs 16ᵇ between which the explosive mixture passes. A coiled spring 17ᶜ normally holds the valve disk 17ª against its seat.

In the side wall of the hollow piston 8 is located a port opening 18, which port is adapted to uncover a spark plug 19 when the two pistons have approached the position in which their heads 8ª and 9ª are the nearest together when the charge will have been compressed to the intended point and the explosive mixture is fired.

20 indicates a row of exhaust ports in the side wall of the hollow piston 8 which when the two pistons are at the limit of their movement and when their heads 8ª and 9ª are farthest removed from each other, are adapted to be uncovered by the piston 9. When the two pistons are in such relative position that the ports 20 are uncovered by the piston 9, said ports are adapted to register with an annular groove 21ª in the cylinder 6. Said groove 21ª opens through an exhaust passage 21ᵇ in the cylinder 6 into an exhaust pipe 21, through which the spent gases escape to the atmosphere surrounding the cylinder.

Eccentric, split spring rings 22, 23, the one within the other, are located in each of three annular recesses 22ª in the side wall of the cylinder 6 in order to make a gas-tight joint between the hollow piston 8 and the cylinder. As shown, there are three sets of said rings located in longitudinally spaced recesses. The rings are located relatively to one another with the thicker part of one ring adjacent the thinner split portion of the other (see Fig. 2) said split portions of the rings being diametrically opposite each other. This arrangement allows the rings to adjust themselves both to the hollow piston 8 and the annular recesses 22ª so as to make a gas-tight joint between the piston 8 and the cylinder 6 and to keep the said piston in alinement with the cylinder. The rings are so proportioned that the ends of the inner ring come quite close together without abutting against each other when said ring is in operative engagement with the piston. The grooves 22ª are each slightly deeper than the combined thickness in a radial direction of the two rings located therein so as to permit free play of the rings. The lower edges of the inner rings 23 are, in each case, rounded as indicated at 23ª (see Fig. 3) so that any lubricant which works upward between the side wall of the hollow piston 8 and the side wall of the cylinder 6, may readily pass in an upward direction between said rings and the side wall of the hollow piston but will be prevented from working downwardly between said parts. The lubricant thus acts, in effect, as an additional seal to prevent the explosive mixture confined between the head of the hollow piston and the head of the cylinder from escaping between the side walls of said piston and cylinder downwardly into the crank case.

In the operation of the engine, the head 8ª of the hollow piston will become heated and in order to provide a greater superficial area for the upper face of said piston head against which the explosive mixture is first discharged when entering the cylinder 6, I prefer to provide a plurality of annular ribs which will act to vaporize any unvaporized fluid which passes into the cylinder, and also any excess of lubricant which passes into the space above the hollow piston. By reason of this construction, it is possible to use in my improved engine, kerosene or other oils of less volatile character, since even if such oils are carried into the cylinder while still in liquid form and in an insufficiently finely divided condition, the upper end of the hollow piston against which they are first discharged when entering the cylinder will offer a large heated area against which they are quickly and easily vaporized, so that a thorough mixture of the vapor and air is made possible.

In the operation of my improved engine, as the piston heads 8ª and 9ª move toward each other, the explosive mixture present in the space between said heads, as will presently appear, is compressed, the compressive force of the confined mixture maintaining the valve 17 in the hollow piston head securely seated so as to prevent the escape of said mixture. At the same time a fresh supply of explosive mixture is drawn into the chamber between the hollow piston head 8ª and the cylinder head 6ª through the valve 13 which is opened by suction due to the tendency to form a vacuum in said space produced by the movement of the piston head 8ª away from the cylinder head 6ª. When the port 18 in the side wall of the hollow piston reaches the spark plug 19, which occurs at the time that the explosive mixture between the piston heads 9ª and 8ª has reached a maximum of compression, the mixture is fired, the explosion causing the two cylinder heads to move away from each other in opposite directions. In the upward movement of the piston head 8ª of the hollow piston, the explosive mixture drawn into the chamber between the cylinder head and the head of the hollow piston will be compressed between the piston head 8ª and the cylinder head 6ª, the valve 13 closing by reason of the action of its spring the instant the piston 8 starts on its upward movement, and the compression holding the valve closely against its seat. This compression continues until when it reaches a predetermined point it has become such as to overcome the spring of the valve 17 in the head of the hollow piston and the pressure in the hollow piston due to the explosion so as to open said valve and permit the explosive mixture to enter into the interior of the hollow piston 8. This occurs at or near the point when the two pistons have reached the respective upward and downward limits of their movement at which time the exhaust ports 20 are uncovered by the piston 9 permitting the escape of the exploded gases through said ports into the outer atmosphere. At the same time the compressed gas in the chamber between the piston head 8ª and the cylinder head 6ª, rushes into the hollow piston, driving ahead of it the exploded gases between the piston heads 8ª and 9ª and thus acting as a scavenger to thoroughly cleanse the hollow piston of said gases. At the next movement of the piston 9 upward and of the piston 8 downward, the explosive mixture taken into the hollow piston is compressed, as first described, and the operation continues as before.

In Fig. 4 I have illustrated a modified form of my invention in which 30 indicates a port in the cylinder wall communicating with the pipe 31ª leading from the carbureter, which port is located at a point such that it will be uncovered when the hollow piston approaches or reaches the inner limit of its movement. 31 indicates a by-pass located in the wall of the cylinder 6ª which by-pass communicates with the interior of the hollow piston 8 when the same is approximately at or near its highest position by means of a port 31ᵇ in the side wall of said hollow piston near its head 8ª. By this construction, the time when the explosive mixture enters the hollow piston may be carefully predetermined and fixed.

In Figs. 5 and 6 I have illustrated a modified form of the invention in which the crank arms for the two pistons are arranged at such an angle that the one piston uncovers the exhaust ports in the side wall of the hollow cylinder in advance of the predetermined time when the hollow piston approaches or reaches the point at or near the upper limit of its movement at which the explosive mixture is admitted into it. In the said figures, like parts are indicated, as in Fig. 1, but 7ˣ indicates the crank arm and 10ª, the associated connecting rod for operating the piston 9 and 7ˣ, 7ˣ, the crank arms and 11ª, 11ª, the associated connecting rods for operating the hollow piston 8. The dotted lines 35, 36 represent respectively the upward and downward limits of movement of the two pistons. In Fig. 5, the piston 8 is shown as uncovering the exhaust ports 20ˣ in the side wall of the hollow piston while the hollow piston is still on its upward movement and before it has reached the upper limit thereof. The exhaust ports 20 are made somewhat elongated so as to open into the annular groove 21ª in the cylinder 6 even though the hollow cylinder has not quite moved into such a position as to bring the said ports into full register with the said groove. The valve 17 in the head of the hollow cylinder is still closed and the spent gases are exhausted to a great extent from the interior of the hollow piston through the exhaust ports 20ˣ before said valve opens which it does, as shown in Fig. 6, when the hollow cylinder has practically reached the upper limit of its movement and when the other cylinder 9 has started on its return upward stroke. Thus the exhaust ports are open but a short time after the valve 17 is opened, that is to say, a time just sufficient to permit the inrushing explosive mixture to drive out the last bit of the spent gases but without permitting the explosive mixture to enter into the hollow cylinder until the pressure therein due to the explosion has been greatly reduced. This arrangement results in a better scavenging action to drive the spent gases from the hollow cylinder and in increased efficiency of the engine.

I claim as my invention:

In an explosive engine including a cylinder having a water jacket, a hollow piston adapted for reciprocation in said cylinder, said hollow piston and cylinder having heads located adjacent each other but spaced apart at all times during the movement of said piston to leave a chamber, an automatic inlet valve concentrically arranged in the head of said cylinder for admitting an explosive mixture into said chamber during the inward movement of said piston, a second piston adapted for reciprocation in said hollow piston, means for admitting the charge from the chamber above the hollow-piston to the chamber within the said hollow-piston, and means for reciprocating said pistons in opposite directions, and concentrically arranged annular flanges on the head of said hollow piston, said flanges acting to increase the superficial area of the piston head within the said chamber.

In testimony that I claim the foregoing as my invention I affix my signature in the presence of two witnesses, this 2nd day of February, A. D. 1912.

HARRY K. TARKINGTON.

Witnesses:
 GEORGE R. WILKINS,
 T. H. ALFREDS.